United States Patent
Fernengel et al.

(10) Patent No.: US 7,746,013 B2
(45) Date of Patent: Jun. 29, 2010

(54) METHOD AND DEVICE FOR CONTROLLING A BRUSHLESS DIRECT-CURRENT MOTOR

(75) Inventors: Mathias Fernengel, Dietzenbach (DE); Reiner Grossmann, Kelkheim (DE); Frank Sader, Frankfurt am Main (DE)

(73) Assignee: Siemens VDO Automotive AG, Regensburg (DE)

( * ) Notice: Subject to any disclaimer, the term of this patent is extended or adjusted under 35 U.S.C. 154(b) by 204 days.

(21) Appl. No.: 11/921,891

(22) PCT Filed: Jun. 7, 2006

(86) PCT No.: PCT/EP2006/062947

§ 371 (c)(1),
(2), (4) Date: Feb. 8, 2008

(87) PCT Pub. No.: WO2006/131523

PCT Pub. Date: Dec. 14, 2006

(65) Prior Publication Data

US 2009/0033260 A1 Feb. 5, 2009

(30) Foreign Application Priority Data

Jun. 8, 2005 (DE) ........................ 10 2005 026 439

(51) Int. Cl.
*H02P 6/16* (2006.01)
(52) U.S. Cl. .......................... 318/400.07; 318/400.03; 318/400.08; 318/400.06; 318/400.23; 318/708; 318/471; 388/923; 361/236
(58) Field of Classification Search ............ 318/400.07, 318/400.03, 400.08, 400.06, 400.23, 708, 318/471; 388/923–934; 361/236–244
See application file for complete search history.

(56) References Cited

U.S. PATENT DOCUMENTS

| | | | |
|---|---|---|---|
| 5,548,202 A | 8/1996 | Schramm et al. | |
| 6,900,607 B2 * | 5/2005 | Kleinau et al. | 318/432 |
| 7,071,649 B2 * | 7/2006 | Shafer et al. | 318/783 |
| 7,099,793 B2 | 8/2006 | Rechberger | |
| 7,199,549 B2 * | 4/2007 | Kleinau et al. | 318/798 |
| 2003/0071594 A1 | 4/2003 | Kleinau et al. | |

(Continued)

FOREIGN PATENT DOCUMENTS

DE 41 41 837 6/1993

(Continued)

OTHER PUBLICATIONS

Search Report dated Sep. 11, 2006 issued for the underlying International Application No. PCT/EP2006/062947.

(Continued)

*Primary Examiner*—Rita Leykin
(74) *Attorney, Agent, or Firm*—Cohen Pontani Lieberman & Pavane LLP

(57) ABSTRACT

Presented in an apparatus for controlling a brushless DC motor with a permanent magnet arranged on a rotor and a stator with windings. The apparatus includes an observer that is adapted to determine an estimated temperature of the permanent magnet as a function of the temperature of the windings, and determine at least one actuating signal for controlling the DC motor as a function of the estimated temperature of the permanent magnet.

6 Claims, 2 Drawing Sheets

U.S. PATENT DOCUMENTS

2003/0076065 A1* 4/2003 Shafer et al. ............ 318/567
2004/0007995 A1 1/2004 Posch
2004/0257011 A1 12/2004 Rechberger

FOREIGN PATENT DOCUMENTS

| DE | 195 02 306 | 8/1996 |
|---|---|---|
| DE | 199 38 678 | 2/2001 |
| DE | 101 26 470 | 1/2003 |
| DE | 103 30 791 | 1/2004 |
| EP | 1 286 456 | 2/2003 |
| JP | 11018496 | 1/1999 |
| WO | WO 03/081764 | 10/2003 |

OTHER PUBLICATIONS

Office Action dated Jan. 25, 2006 issued for the corresponding German Application No. 10 2005 026 439.5-32.

* cited by examiner

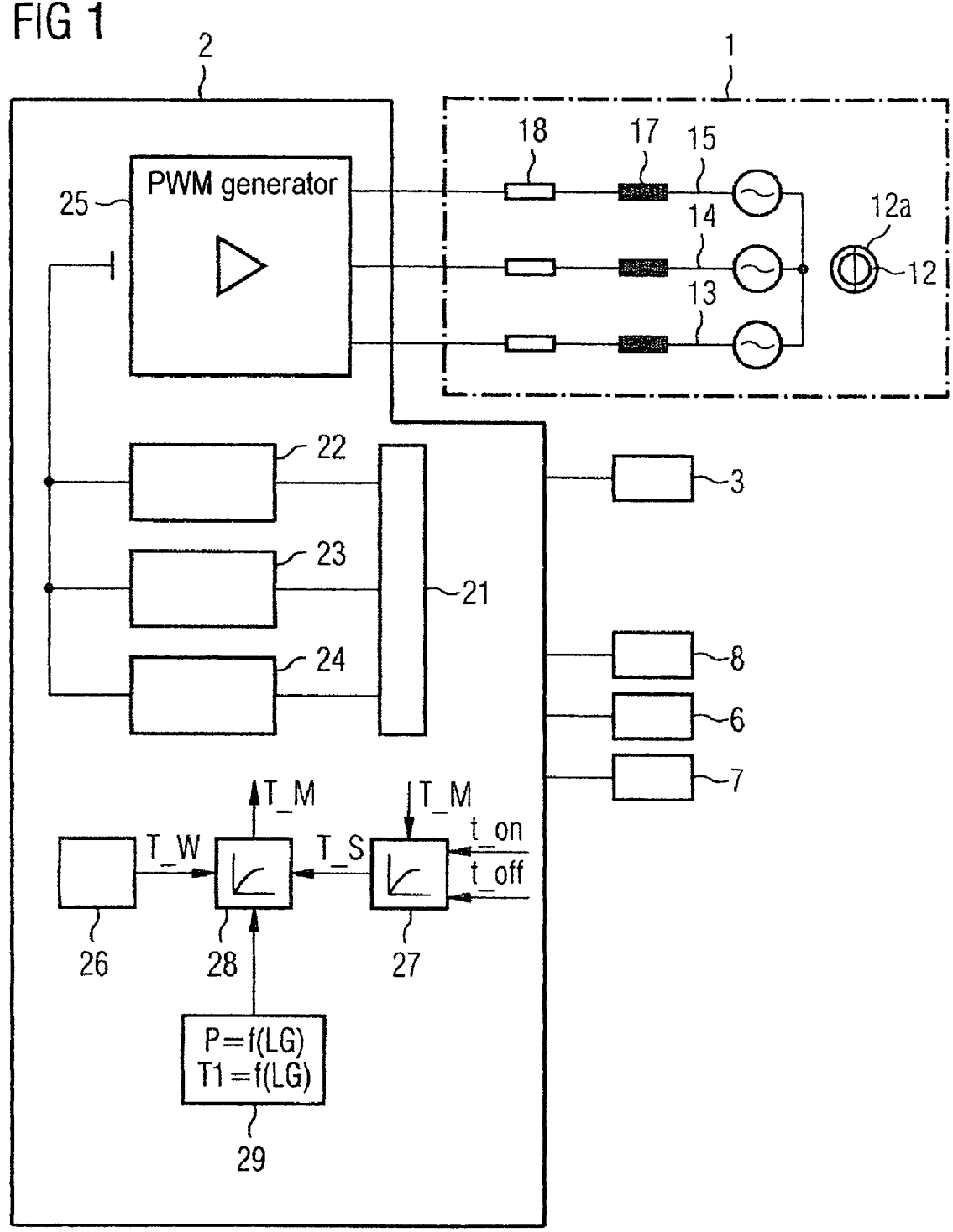

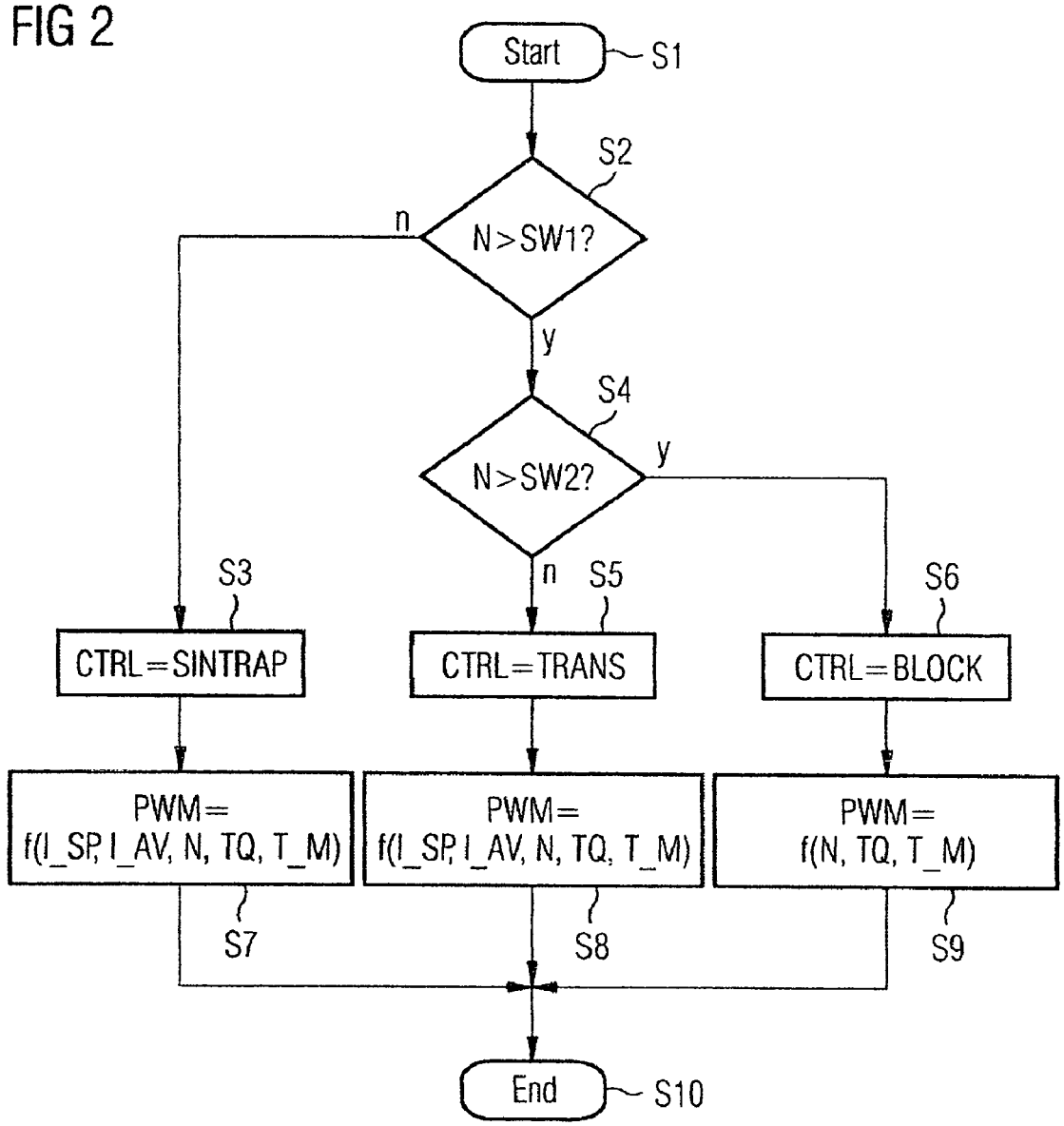

METHOD AND DEVICE FOR CONTROLLING A BRUSHLESS DIRECT-CURRENT MOTOR

CROSS-REFERENCE TO RELATED APPLICATIONS

This is a U.S. National Stage of International Application No. PCT/EP2006/062947, filed on 7 Jun. 2006. Priority is claimed to the German Application No. 10 2005 026 439.5, filed on 8 Jun. 2005.

BACKGROUND OF THE INVENTION

1. Field of the Invention

The invention relates to a method and an apparatus for controlling a brushless DC motor.

2. Description of the Related Art

Brushless DC motors (BLDC motors) are machines with permanent magnets in the rotor. The rotor produces the excitation field. The stator of the BLDC motor has a three-phase winding and is fed by an inverter, which makes available three-phase current. BLDC motors are self-commutated machines and require a rotation angle position encoder for operation. The armature current forms, together with the field of the permanent magnet, a torque which is as constant as possible over time. The reconnection of the stator field takes place with the aid of the inverter as a function of the rotor position so that a constant angle of $\pi/2$ electrical is set between the stator rotating magnetomotive force and the rotor field. The rotor position is preferably detected via sensors or derived from terminal voltages and/or terminal currents. The operational response largely corresponds to that of the DC motor. BLDC motors have very good dynamics and can be controlled easily. The brushless technology is free from wear and maintenance.

BLDC motors are used in particular for power-assisted steering systems in motor vehicles. Power-assisted steering systems are devices for increasing the steering force which are designed to increase a steering force applied by the driver of the motor vehicle. The force is increased electromechanically by means of the BLDC motor. The power-assisted steering system preferably comprises a torque sensor, which detects the present torque transmitted by the driver onto the steering wheel. The torque is then increased, it being possible for the gain factor to be dependent on various operational variables of the motor vehicle. Then, the BLDC motor is controlled in a corresponding manner. The BLDC motor is preferably coupled to the steering device of the motor vehicle by means of a transmission. Irregularities in the torque which is emitted by the BLDC motor are perceived by the driver as jolts on the steering wheel. A regularity of the torque is therefore essential for a high degree of driving comfort. Such irregularities of the torque are also referred to as torque ripple.

DE 199 38 678 A1 has disclosed a method and an apparatus for controlling a BLDC motor which is operated with block commutation of the voltage. The DC motor is controlled in such a way that the voltage applied deviates from the voltages provided for the block commutation as a function of the rotation speed of the motor and its current consumption. For this purpose, a table is provided from which altered pulse widths when switching over the windings of the DC motor as a function of the rotation speed N and current values are read and controlled in a corresponding manner.

DE 101 26 470 A1 has disclosed a method for operating a steering device with a device for increasing the steering force. The device for increasing the steering force is an electrically commutated electric motor, to be precise a BLDC motor. The BLDC motor is operated using current control. A voltage to be produced is determined as a function of a desired current, a desired rotation speed and a temperature of the electric motor.

SUMMARY OF THE INVENTION

The object of the invention is to provide an apparatus and a method for controlling a BLDC motor which make precise control of the BLDC motor possible.

The invention is characterized by an apparatus and a corresponding method for controlling the BLDC motor, with a permanent magnet arranged on a rotor and a stator with windings. The apparatus is designed to determine a temperature of the windings. It has an observer, which is designed to determine an estimated temperature of the permanent magnet as a function of the temperature of the windings. In addition, it is designed to determine at least one actuating signal for controlling the DC motor as a function of the estimated temperature of the permanent magnet.

The invention therefore makes use of the knowledge that the properties of the permanent magnet change as a function of its temperature and therefore a different torque is produced without taking into consideration the temperature of the permanent magnet given an actuating signal which remains the same for controlling the DC motor as a function of the temperature. Furthermore, it makes it possible to determine the temperature of the permanent magnet in a very simple manner since the temperature of the windings can be detected easily in contrast to the temperature of the permanent magnet. The torque to be produced can therefore be set in a very precise manner without needing to provide any additional sensors.

The invention is also based on the knowledge that, in particular during short-term operation of the brushless DC motor, significant temperature differences between the stator and the rotor can occur. These temperature differences have an influence on the torque response, and thus the amplitude and profile of the torque change. The influence of the temperature of the permanent magnet can therefore significantly exceed the influence of the winding temperature on the torque produced.

In accordance with an advantageous configuration of the invention, the observer comprises a PT1 element. In this way, the estimated temperature of the permanent magnet can be determined in a particularly simple but nevertheless precise manner.

In this context it is advantageous if at least one parameter of the PT1 element is dependent on at least one load variable of the DC motor. In this way, very precise control can be ensured in a simple manner over substantially the entire load range of the DC motor, independently of temperature fluctuations of the permanent magnet.

In this context it is particularly advantageous if the load variable is the rotation speed of the DC motor or the current through the windings. These can be determined very easily and represent the load-dependent response of the DC motor very effectively.

In accordance with a further advantageous configuration of the invention, a further observer is provided which is designed to determine an estimated start temperature of the permanent magnet when the DC motor is switched on as a function of a time period since the last time the DC motor was switched off. The estimated temperature of the permanent magnet can therefore be determined with high accuracy, in particular in the case of a relatively short time period since the last time the DC motor was switched off, very close in time to the time at which the DC motor is switched on again and therefore precise setting of the torque can be ensured very quickly.

In accordance with a further advantageous configuration of the invention, provision is made for the winding temperature to be determined as a function of the current through the windings. This has the advantage that the winding temperature can be determined without the use of an additional sensor.

BRIEF DESCRIPTION OF THE DRAWINGS

Exemplary embodiments of the invention will be explained below with reference to the drawings.

FIG. 1 is an illustrative sechmatic diagram of a BLDC motor 1 and an apparatus 2 for controlling the BLDC motor.

FIG. 2. is an illustrative flowchart of a program for controlling the BLDC motor shown in FIG. 1.

Elements having the same construction and function have been provided with the same reference symbols throughout the figures.

DETAILED DESCRIPTION OF THE PREFERRED EMBODIMENTS

The BLDC motor 1 comprises a permanent magnet rotor 12 and a stator, which preferably has three winding phases 13, 14, 15, it being possible for the load applied to these winding phases to be represented in each case by an inductance 17 and a resistance 18. The three winding phases 13-15 are preferably star-connected. One or more permanent magnets 12a are arranged on the rotor 12.

An apparatus 2 for controlling the BLDC motor 1 has a decision unit 21, first to third control units 22 to 24 and a pulse width modulation generator 25.

The decision unit 21 decides, as a function of operational variables supplied to it, such as the rotation speed N at which the BLDC motor 1 is intended to be operated, for example, or else the torque TQ which is intended to be emitted by the BLDC motor, in which control mode CTRL the BLDC motor is intended to be operated. A torque sensor 7, for example, can be associated with the control unit 2 for this purpose, which torque sensor 7 detects the torque produced by a driver of the motor vehicle in which the BLDC motor is preferably installed at a rod coupled to the steering wheel. Then, the torque TQ to be applied by the BLDC motor is determined as a function of this torque and possibly further operational variables of the motor vehicle.

A position sensor 3, which detects the angular position of the rotor 12, is also associated with the apparatus 2 for controlling the BLDC motor 1. Then, the rotation speed N can also be determined as a function of the time profile of the detected angular position. The position sensor 3 may be in the form of a Hall sensor, magnetoresistive sensor, an optical sensor or a so-called resolver.

The decision unit 21 decides which of the control units 22 to 24 produce an actuating signal for a pulse width modulation generator 25. This decision is made as a function of the control mode CTRL to be controlled. If the control mode CTRL is that for impressing a sinusoidal or trapezoidal current SINTRAP, the first control unit 22 produces the actuating signal. If on the other hand the control mode CTRL is the transition mode TRANS, the second control unit 23 produces the actuating signal. If the control mode CTRL is the block commutation BLOCK, the third control unit 24 produces the actuating signal.

The pulse width modulation generator 25 produces voltage signals, which are impressed into the respective winding phases 13, 14, 15 of the BLDC motor 1 by means of a bridge circuit associated with the pulse width modulation generator 25.

It is also possible to provide two current sensors 6, 8, which each detect the current in a winding phase 13 to 15.

The apparatus 2 for controlling the BLDC motor 1 also comprises a winding temperature unit 26, which is designed to determine a temperature $T\_W$ of the windings of the winding phases 13 to 15. Preferably, a temperature sensor, such as an NTC thermistor, for example, is provided for this purpose, thermally coupled to the windings or at least one winding. Alternatively, the temperature $T\_W$ of the windings is determined as a function of the respective detected current through the winding phases 13 to 15. In this context, use is preferably made of the knowledge that the voltage drop across the windings can be modeled easily and therefore the temperature $T\_W$ of the windings can be determined easily as a result of the known temperature dependence of the nonreactive resistance of the windings. The determination of the temperature $T\_W$ of the windings can therefore take place in a particularly simple manner in operating states in which the inductive voltage drop of the windings is negligible.

In addition, a first observer 27 is provided which is designed to determine an estimated start temperature $T\_S$ of the permanent magnet 12a when the DC motor is switched on as a function of the times $t\_off$, $t\_on$ of the last instance of the BLDC motor 1 being switched off and, respectively, the present instance of the BLDC motor 1 being switched on. The first observer preferably comprises a filter, which represents the cooling response of the permanent magnet once the DC motor has been switched off. The parameters of this filter can be determined empirically by means of tests with the BLDC motor 1 and are preferably stored in a data store of the apparatus 2 for controlling the BLDC motor 1. The filter may be in the form of a PT1 filter, for example, or else in the form of another suitable filter.

In addition, a second observer 28 is provided which is designed to determine an estimated temperature $T\_M$ of the permanent magnet 12a as a function of the temperature $T\_W$ of the windings. For this purpose, it preferably likewise comprises a filter whose parameters can be fixedly predetermined in a simple embodiment, but can preferably be determined in a parameter unit 29 as a function of at least one load variable LG of the BLDC motor. This preferably takes place by means of a characteristic curve or a family of characteristics as a function of the at least one characteristic. The characteristic curve or curves or family of characteristics or families of characteristics are preferably determined in advance by means of tests or simulations and are stored in the data store of the apparatus 2 for controlling the BLDC motor 1.

The filter of the second observer is preferably a PT1 filter and therefore a PT1 element, with a proportional parameter P and a delay parameter T1. The load variable is preferably the rotation speed of the rotor 12 of the BLDC motor and/or the current through the windings of the BLDC motor. However, it may also be any other desired load variable LG of the BLDC motor.

The filter of the second observer 28 is designed to filter the temperature $T\_W$ of the windings and therefore to determine the estimated temperature $T\_M$ of the permanent magnet 12a. Since, in particular once the BLDC motor has been switched off for a short period of time, the temperature of the permanent magnet 12a can significantly deviate from the temperature of the windings, the start temperature $T\_S$ of the permanent magnet is preferably taken into consideration in a suitable manner when determining the estimated temperature T_M of the permanent magnet 12a. Initially the start temperature T_S of the permanent magnet is therefore then preferably supplied to the filter of the second observer 28 as the start value after the short-term switching-off instead of the temperature T_W of the windings.

A program for controlling the BLDC motor 1 is stored in the apparatus 2 for controlling the BLDC motor 1 and is executed during the operation of the BLDC motor 1. The program (FIG. 2) is started in a step S1, in which possibly variables are initialized.

In a step S2, a check is carried out to ascertain whether the rotation speed N at which the BLDC motor 1 is intended to be operated is greater than a first threshold value SW1. The first threshold value SW1 is preferably selected so as to approximately correspond to ⅓ of the no-load rotation speed of the BLDC motor 1. If the condition of step S2 is not met, the operating mode CTRL for impressing the sinusoidal or trapezoidal current SINTRAP is controlled in a step S3.

In a step S7, an actuating signal PWM for the pulse width modulation generator 25 is then produced. This takes place as a function of a desired value I_SP of the current in the respective winding phase 13 to 15 and the estimated temperature T_M of the permanent magnet. As an alternative to this, the desired value I_SP of the current can also be determined as a function of the estimated temperature T_M of the permanent magnet. The desired value I_SP of the current is determined as a function of the torque which is intended to be emitted by the BLDC motor 1 and possibly also as a function of the rotation speed N at which the BLDC motor 1 is intended to be operated. Preferably, a model of the BLDC motor is provided by means of which the actuating signal PWM is determined as a function of the desired value I_SP of the current or its sinusoidal or trapezoidal profile. The model is preferably determined by tests with the BLDC motor 1 or by simulations and permanently stored in the apparatus 2 for controlling the BLDC motor 1.

As a result of the sinusoidal or trapezoidal current being impressed into the winding phases 13 to 15, at relatively low rotation speeds N, i.e. rotation speeds N which are lower than the first threshold value SW1, a particularly uniform torque is produced by the BLDC motor 1.

Alternatively or in addition, the current can also be regulated if corresponding current sensors 6, 8 are provided. In this case, the actuating signal PWM for the pulse width modulation generator 25 is then determined as a function of the difference between the desired value I_SP and an actual value I_AV of the current in the respective winding phases 13-15. As a result, the current profile in the winding phases 13-15 can be set yet more precisely if the current sensors accurately detect the actual value I_AV of the current.

If the condition of step S2 is met, on the other hand, i.e. the rotation speed N at which the BLDC motor 1 is intended to be operated is greater than the first threshold value SW1, a check is carried out in a step S4 to ascertain whether the rotation speed N at which the BLDC motor 1 is intended to be operated is greater than a second threshold value SW2.

If the condition of step S4 is met, the operation with block commutation BLOCK of the voltage is predetermined in a step S6 as the control mode CTRL.

In a step S9, the actuating signal PWM for the pulse width modulation generator 25 is produced as a function of the rotation speed N and the estimated temperature T_M of the permanent magnet T_M and/or the torque TQ and the estimated temperature T_M of the permanent magnet T_M which is intended to be emitted by the BLDC motor 1. Block commutation BLOCK is controlled. Within the realms of the block commutation BLOCK, voltage blocks of 120 degrees with 60 degree gaps or voltage blocks of 180 degrees can be impressed on the respective winding phases 13-15 as a function of the estimated temperature T_M of the permanent magnet T_M and the rotation speed N at which the BLDC motor 1 is intended to be operated and/or the estimated temperature T_M of the permanent magnet T_M and the torque TQ at which the BLDC motor 1 is intended to be operated.

The level of the voltage applied to the individual winding phases 13-15 in the control mode CTRL of the block commutation BLOCK can also be set as a function of the rotation speed N and/or the torque TQ, which is intended to be produced by the BLDC motor 1, by means of the pulse width modulation.

In the control mode CTRL of the block commutation BLOCK, the BLDC motor 1 is operated with a high efficiency which is up to approximately 25% higher than that in the control mode CTRL for impressing a sinusoidal or trapezoidal current SINTRAP. It is thus also possible for a compact BLDC motor 1 to be operated even at high rotation speeds N and high torques TQ. As a result of the fact that the control mode CTR1 of the block commutation BLOCK is only assumed if the rotation speed N is greater than the second threshold value SW2, which is preferably ⅔ of the no-load rotation speed N of the BLDC motor 1, it is ensured that the torque irregularity is very low during the control mode CTRL of the block commutation BLOCK.

In a step S10, the program is then ended. The program shown in FIG. 2 is preferably executed again after a predeterminable time period.

If the condition of step S4 is not met, a control mode CTRL of the transition operating mode TRANS is controlled.

In a step S8, the actuating signal PWM for the pulse width modulation generator 25 is set as a function of the estimated temperature T_M of the permanent magnet T_M and the rotation speed N at which the BLDC motor 1 is intended to be operated and the estimated temperature T_M of the permanent magnet T_M and the torque TQ which is intended to be produced by the BLDC motor 1 and as a function of the desired value I_SP and possibly the actual value I_AV of the current in the respective winding phase 13 to 15. As the rotation speed increases, in this case there is a smooth transition from the sinusoidal or trapezoidal current SINTRAP being impressed to the block commutation BLOCK of the voltage. The control in the transition region in this case takes place as a function of stored information which is determined in advance by tests with the BLDC motor.

In a particularly simple configuration of the apparatus 2 for controlling the BLDC motor 1, either the control mode CTRL for the regulation SIN to sinusoidal current or the block commutation BLOCK is assumed. The decision as to which control mode CTRL is intended to be assumed then takes place as a function of only one threshold value of the rotation speed N, which is then preferably approximately half the no-load rotation speed.

What is claimed is:

1. An apparatus for controlling a brushless DC motor with a permanent magnet arranged on a rotor and a stator with windings, the apparatus comprising:
   a winding temperature unit determining a temperature of the windings;
   a first observer adapted to determine an estimated temperature of the permanent magnet as a function of the determined temperature of the windings, and determine at least one actuating signal for controlling the DC motor as a function of the estimated temperature of the permanent magnet; and a second observer adapted to determine an estimated start temperature of the permanent magnet when the DC motor is switched on as a function of a time period since the last time the DC motor was switched off.

2. The apparatus as claimed in claim 1, wherein the observer comprises a PT1 element.

3. The apparatus as claimed in claim 2, wherein at least one parameter of the PT1 element is dependent on at least one load variable of the DC motor.

4. The apparatus as claimed in claim 3, wherein the at least one load variable is the rotation speed or the current through the windings.

5. The apparatus as claimed in claim 1, wherein the winding temperature unit determines the temperature of the windings as a function of the current through the windings.

6. A method for controlling a brushless DC motor with a permanent magnet arranged on a rotor and a stator with windings, the method comprising:
  determining a temperature of the windings;
  determining, by an observer, an estimated temperature of the permanent magnet as a function of the temperature of the windings;
  determining at least one actuating signal for controlling the DC motor as a function of the estimated temperature of the permanent magnet; and
  determining by a second observer an estimated start temperature of the permanent magnet when the DC motor is switched on as a function of a time period since the last time the DC motor was switched off.

* * * * *